J. R. Treadwell,
Bread and Cracker Machine,
N°. 39,972. Patented Sept. 15, 1863.

Witnesses:
F. C. Treadwell Jun.
Joseph Grevatt

Inventor:
John R. Treadwell

UNITED STATES PATENT OFFICE.

JOHN R. TREADWELL, OF BROOKLYN, NEW YORK.

IMPROVEMENT IN PREPARING DOUGH FOR BISCUIT, &C.

Specification forming pa t of Letters Patent No. 39,972, dated September 15, 1863; antedated September 2, 1863.

*To all whom it may concern:*

Be it known that I, JOHN R. TREADWELL, of the city of Brooklyn, county of Kings, and State of New York, have invented a new and useful improvement in the mode of preparing dough for hard biscuit, crackers, and similar articles made of hard dough; and I do hereby declare that the following is a full and correct description thereof, reference being had to the annexed drawings, and to the letters of reference thereon.

My said invention consists in preparing hard dough in suitable, convenient, solid masses, with a comparatively smooth and indurated surface or skin, by the application of pressure to a mass of loosely-mixed or "cast" dough by means of molds and a suitable press, substantially as hereinafter described, and in such manner that the loosely-mixed or cast dough is pressed by, and in, the molds, at one operation into comparatively smooth or skin-covered slabs, suitable to undergo the subsequent operation of breaking in the break-rollers. But to more particularly describe my invention, I will refer to the drawings, of which—

Figure 1:
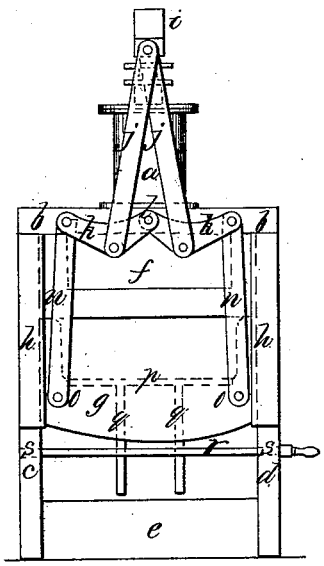
Figure 2:
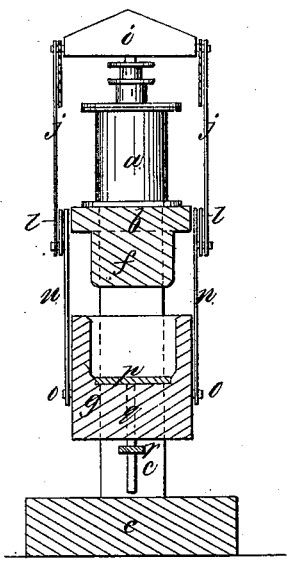
Figure 3:
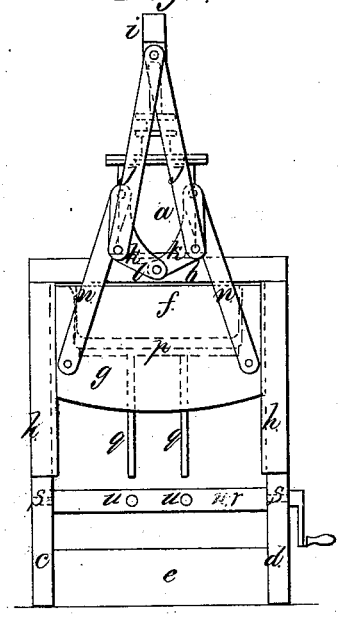
Figure 4:
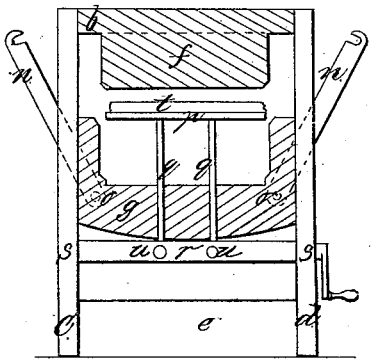

Figure 1 is a front elevation of press and molds open to receive the dough; Fig. 2, a cross-section; Fig. 3, a front elevation showing molds closed and compressed; Fig. 4, a longitudinal section showing operation of discharger for lifting the pressed dough out of the mold.

Letter $a$ represents a steam-engine cylinder, supported by a bed-plate, $b$, which is sustained by two posts, $c\ d$, fast at their lower ends to a base, $e$. A stationary plunger, $f$, is fastened to the under side of the bed-plate $b$. The plunger is of suitable size and depth to fit the mold $g$, which slides up and down on guides $h\ h$ on the posts $c\ d$, being connected with the cross-head $i$ of the piston of the steam-cylinder by means of the links $j$, progressive levers $k$, which turn on fulcrum-pins $l$, and links $n$ from the progressive levers to the mold $g$, to which they are connected by suitable joints, $o$. A discharge-plate, $p$, lies in the bottom of the mold, and is moved up to discharge the pressed slab of dough, when the mold is lowered, by the rods $q$, fastened to the discharge-plate and passing down through holes in the bottom of the mold, coming in contact with the bar $r$, which is supported by and turns freely in bearings $s$, and is provided with a crank for the purpose of turning it a quarter of a turn, so that when the slab of dough $t$, Fig. 4, is removed the holes $u$ in the bar will come opposite to the end of the rods $q$ and permit rods and discharger to descend to the bottom of the mold.

The mold, which should be reasonably smooth inside, may be made of wood or iron, about thirty-six inches by eighteen inches and twelve inches deep for large establishments. The mold should be suspended sufficiently below the plunger to admit of shoveling the loosely-mixed or cast dough into the mold with dispatch. The plunger should be reasonably smooth on its face for the purpose of communicating a correspondingly smooth surface to that part of the compressed slab of dough on which it acts, as does also the surface of the molds.

The dough may be cast by machinery or by hand, so that it be in a loose mass, formed by "shaking up," as it is termed, a proper proportion of flour, salt, and water, and other ingredients, if required, to form dough, so as to distribute the ingredients among each other.

The quantity of water used for hard-biscuit and cracker dough is not sufficient to form a paste by thus shaking up by the hands or by metal fingers in a machine, but is a loose mass, which requires severe labor to knead into a dough; but by this my invention it is reduced at once by compression in a confined mold into a comparatively smooth slab with an indurated surface or skin upon it that materially facilitates the subsequent operations of reducing it to proper size in the break-rollers and preparing-machines now generally used.

The molds may be connected with any suitable kind of press. If a steam-press, as above described, is used, the cylinder must be connected with a steam-boiler by any suitable connecting-pipe opening under the piston and furnished with a valve, to connect also with an exhaust-opening, under control of the dough-maker; but as such presses are well known it is not necessary to make a minute description of them here.

I am aware that dough, after it has been formed into a compact slab or mass by kneading by hand and subsequent "breaking" in the brakes commonly used, has been placed in a box, and by means of a plunger has been forced through holes in the bottom of the box for the purpose of forming continuous strips of dough to be cut off for crackers. Such is not my invention; neither do I claim, broadly, applying pressure to dough in molds.

The dough made by my process above described is superior in quality to dough ordinarily made by machinery, which is compacted by the grinding action of rubbing-surfaces and is turned out of the grinding-machines with a rough exterior and without the smooth surface and convenient form which characterize the dough produced by my invention, to say nothing of the injury done to the dough by the grinding action of the surfaces.

I claim—

The application of pressure to a mass of loosely-mixed or cast hard-biscuit or cracker dough by means of molds and a suitable press, substantially as described, whereby the mass is compressed into a solid slab of dough, having a comparatively smooth surface or skin, of convenient shape for the succeeding operation of the break-rolls, substantially as set forth.

JOHN R. TREADWELL.

Witnesses:
   F. C. TREADWELL, Jr.,
   JOSEPH GREVATT.